(12) United States Patent
Sethuraman et al.

(10) Patent No.: US 8,316,123 B2
(45) Date of Patent: Nov. 20, 2012

(54) MANAGING BOOT IMAGES IN A RETAIL STORE ENVIRONMENT

(75) Inventors: Radhakrishnan Sethuraman, Austin, TX (US); Manuel Silveyra, Round Rock, TX (US)

(73) Assignee: Toshiba Global Commerce Solutions Holdings Corporation, Tokyo (JP)

( * ) Notice: Subject to any disclaimer, the term of this patent is extended or adjusted under 35 U.S.C. 154(b) by 1002 days.

(21) Appl. No.: 11/676,316

(22) Filed: Feb. 19, 2007

(65) Prior Publication Data

US 2008/0201571 A1 Aug. 21, 2008

(51) Int. Cl.
*G06F 15/173* (2006.01)
*G06F 9/445* (2006.01)

(52) U.S. Cl. ........................................ 709/224; 717/178

(58) Field of Classification Search .................... 713/2; 709/224–227, 231–233; 717/178
See application file for complete search history.

(56) References Cited

U.S. PATENT DOCUMENTS

| 7,062,643 | B2 * | 6/2006 | Miyajima | 713/1 |
| 2003/0145061 | A1 * | 7/2003 | Kochiya | 709/208 |
| 2004/0163008 | A1 * | 8/2004 | Kim | 714/4 |
| 2006/0031537 | A1 * | 2/2006 | Boutboul et al. | 709/228 |
| 2006/0168012 | A1 * | 7/2006 | Rose et al. | 709/206 |
| 2006/0184688 | A1 * | 8/2006 | Ganguly et al. | 709/232 |

* cited by examiner

*Primary Examiner* — Chirag R Patel
(74) *Attorney, Agent, or Firm* — DeLizio Gilliam, PLLC

(57) ABSTRACT

A retail environment can include a plurality of client devices communicatively coupled with the server. A first client device of the plurality of client devices begins downloading a new boot image from the server via a first connection. The first client device monitors a transfer rate of the new boot image against a threshold. If the first client device determines that the transfer rate falls below the threshold, then the first client device broadcasts a request to other client devices of the plurality of client devices for the boot image. If a second client device of the plurality of client devices affirmatively responds to the request, then the first client device begins downloading a second portion of the boot image from the second client device via a second connection, and monitoring a cumulative transfer rate of the downloading over the first and the second connections.

12 Claims, 2 Drawing Sheets

MANAGING BOOT IMAGES IN A RETAIL STORE ENVIRONMENT

FIELD OF THE INVENTION

The present invention relates to the field of network computing and particularly to a system and method for managing boot images in a retail store environment.

BACKGROUND OF THE INVENTION

The retail industry typically implements a three layer system or architecture for network computing communications including: 1) a central office server; 2) a store server; and 3) multiple client devices (ex-cash registers). An operating system for the cash registers may be made at the central office. Further, the central office server may push the operating system (i.e., image) to the store server, with the store server acting as a local repository for the image. The store server may be low end hardware, or perhaps may itself be a cash register, thereby serving a dual role as store server and cash register.

Currently, when the cash registers of the store boot up, the cash registers download the image from the store server. However, when the image is of a large enough size, the process of downloading of the image from the store server may be slowed due to stress on the store server. As a result, it may take a long time for the cash registers to boot with the current system. Further, start up or boot times for the cash registers may differ, depending on the stress placed on the store server during the download process.

In an attempt to alleviate stress on the store server by "staggering" download demands on the store server during the download process, a current solution involves multicasting the image to the cash registers and allowing the cash registers to begin downloading the image at various points in time during the multicast transmission of the image. For example, a first cash register may begin downloading the image at the beginning of the image transmission, while a second cash register may begin downloading the image after the transmission has already begun. Further, the second cash register may then go back and download missing segments of the image from the store server (ex-image segments that were transmitted before the second cash register began downloading the image). However, current solutions may still stress the store server during the download process, thereby causing unpredictable download times of the image for the cash registers.

Therefore, it may be desirable to have a system and method for managing boot images in a retail store environment which addresses the above-referenced problems and limitations of the current solutions.

SUMMARY OF THE INVENTION

Accordingly, an embodiment of the present invention is directed to a system for managing boot images in a retail store environment, including: a server; and a plurality of client devices communicatively coupled with the server, a first client device included in the plurality of client devices being configured for downloading a first portion of a boot image from the server via a first connection, the first client device further being configured for downloading a second portion of the boot image from a second client device included in the plurality of client devices via a second connection.

In a further embodiment, the present invention is directed to a method for managing boot images in a retail store environment, including: determining that a server includes a new boot image; downloading a first portion of the new boot image from the server via a first connection; and when downloading of the first portion occurs at a rate below a predetermined threshold download rate, broadcasting a request to a plurality of client devices to determine if a second portion of the new boot image is available for download.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
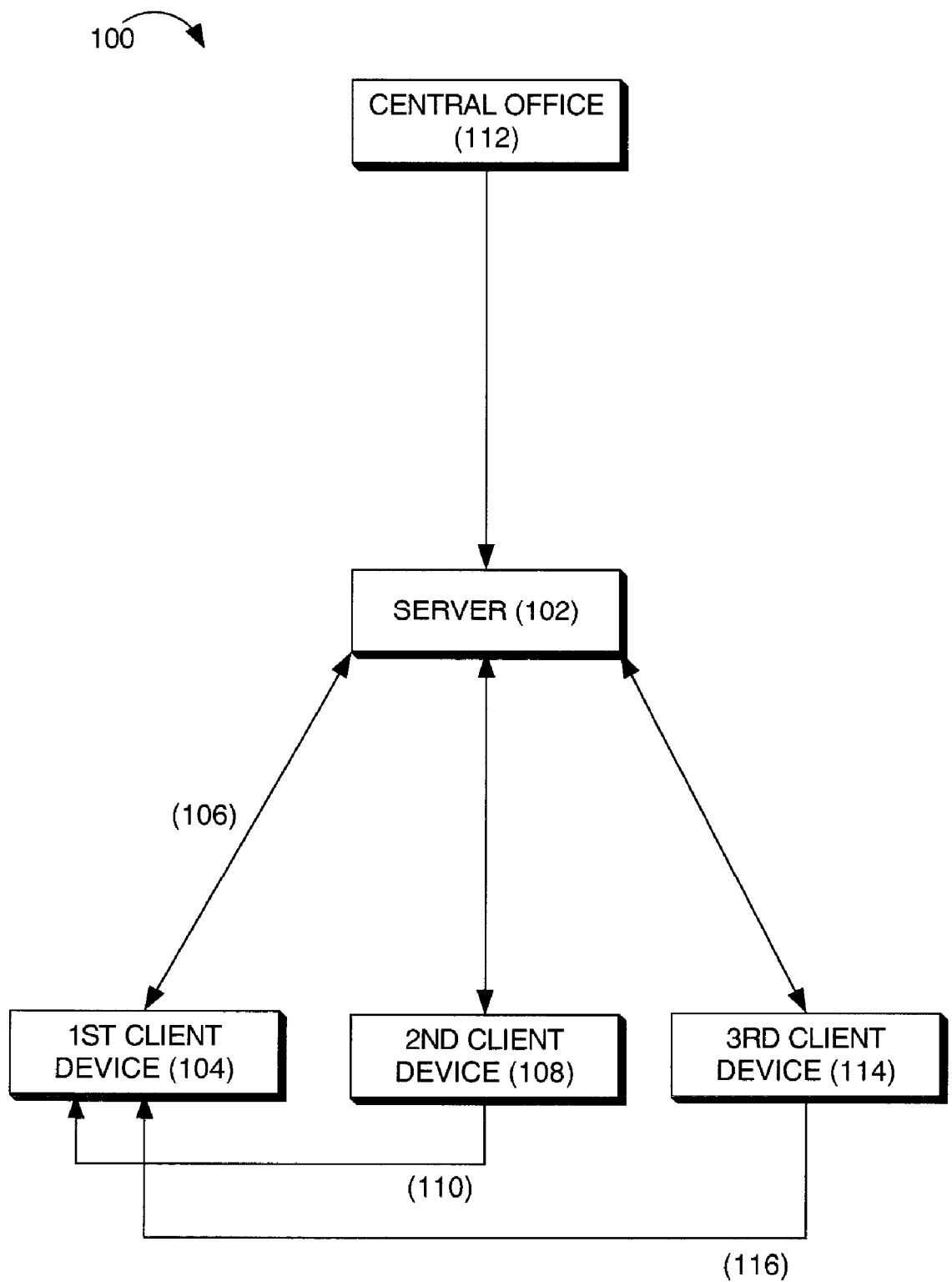
FIG. 1 is a block diagram illustration of a system for managing boot images in a retail store environment in accordance with an exemplary embodiment of the present invention.

FIG. 1 illustrates a block diagram configuration for a system 100 for managing boot images in a retail store environment in accordance with an exemplary embodiment of the present invention. In a present embodiment, the system 100 includes a server 102, such as a server for a retail store. For example, the server 102 may be low end hardware or a cash register. In an exemplary embodiment, the system 100 further includes a plurality of client devices communicatively coupled with the server 102. For instance, the client devices may be cash registers or other like POS ("Point of Sale") store devices, communicatively coupled with the server 102, thereby forming a subnet for the store. A first client device 104 included in the plurality of client devices may be configured for downloading a first portion of a boot image from the server 102 via a first connection 106. For example, if the first client device is a cash register, the boot image may be an operating system for the cash register. When the first client device 104 is booted up (ex.-powered on), it may contact the server 102 and begin to download the first portion of the boot image from the server 102. For instance, when the first client device 104 boots up, it may load a lightweight kernel. Further, the lightweight kernel may be configured for checking with the server 102 to determine if a new boot image (ex.-operating system) for the particular hardware of the first client device 104 is available. If a new boot image for the particular hardware of the first client device 104 is available, then the first client device is configured for downloading at least a portion of the new boot image from the server 102. In a present embodiment, the boot image may be downloaded to any rewritable memory, such as a hard disk, of the first client device 104.

In exemplary embodiments, the first client device 104 is further configured for monitoring a download rate or transfer rate of the first client device and comparing the download rate or transfer rate to a predetermined threshold download rate or predetermined threshold transfer rate of the first client device. For example, if the first client device detects that its monitored download rate is less than its predetermined threshold download rate, the first client device may interpret this as a sign that the server 102 is overtaxed/stressed due to download traffic demands. The first client device 104, in an attempt to alleviate download traffic demands on the server 102, may then attempt to locate another source from which to obtain the second portion of the boot image.

In a present embodiment, the first client device 104 is configured for broadcasting a request to a second client device 108, such as a cash register, included in the plurality of client devices for obtaining the second portion of the boot image when the monitored download rate of the first client device is less than the predetermined threshold download rate of the first client device. In additional embodiments, the first client device 104 may be further configured for receiving an affirmative response to the broadcast request from the second client device 108. In exemplary embodiments, the first client device 104 may be further configured for establishing a second connection 110 with the second client device 108. For instance, when the first client device 104 receives an affirmative response to the broadcast request from the second client device 108, the first client device 104 may establish the second connection 110 with the second client device 108.

In an exemplary embodiment, the first client device 104 may be further configured for downloading the second portion of the boot image from the second client device 108 via the second connection 110. By providing a download source other than the server 102, the present invention may promote faster download time for the first client device and may reduce stress on the server 102 caused by download traffic.

In a present embodiment, the first client device 104 is further configured for downloading the first portion of the boot image from the server 102 via the first connection 106 while downloading the second portion of the boot image from the second client device 108 via the second connection 110. For instance, the first client device 104 may simultaneously download the first portion of the boot image from the server 102 via the first connection 106 and the second portion of the boot image from the second client device 108 via the second connection 110. In an exemplary embodiment, the first client device 104 may monitor a cumulative download or transfer rate of the first client device over the first and second connections (106, 110). When the cumulative download or transfer rate falls below the predetermined threshold download rate, the first client device 104 may then send a second broadcast request to the plurality of client devices, said second request requesting a third portion of the boot image. It is contemplated that the first client device 104 may receive an affirmative response from, establish a third connection 116 with, and download the third portion of the boot image from a third client device 114 in a manner as described above. For instance, the first client device 104 may simultaneously download the first portion of the boot image from the server 102 via the first connection 106 and the second portion of the boot image from the second client device 108 via the second connection 110 and the third portion of the boot image from the third client device 114 via the third connection 116, thereby alleviating download traffic demands on the server 102 and promoting predictability in download and boot up time.

In further embodiments, the server 102 is configured for receiving the boot image from a central office 112. For instance, the server 102 may function as a local repository for boot images (ex.-operating systems) for the client devices (104, 108, 114) (ex-cash registers), said boot images (ex.-operating systems) being made at the central office 112 and provided to the server 102 by the central office 112, such as via a central office server communicatively coupled to the server 102.

In a present embodiment, the boot image is transmitted from the server 102 to the plurality of client devices (104, 108, 114) via multicast transmission. Further, the server 102 may be configured for signaling the client devices (104, 108, 114) to begin downloading the multicast boot image during various points in time during the multicast transmission, such as when each client device begins boot up.

Figure 2:
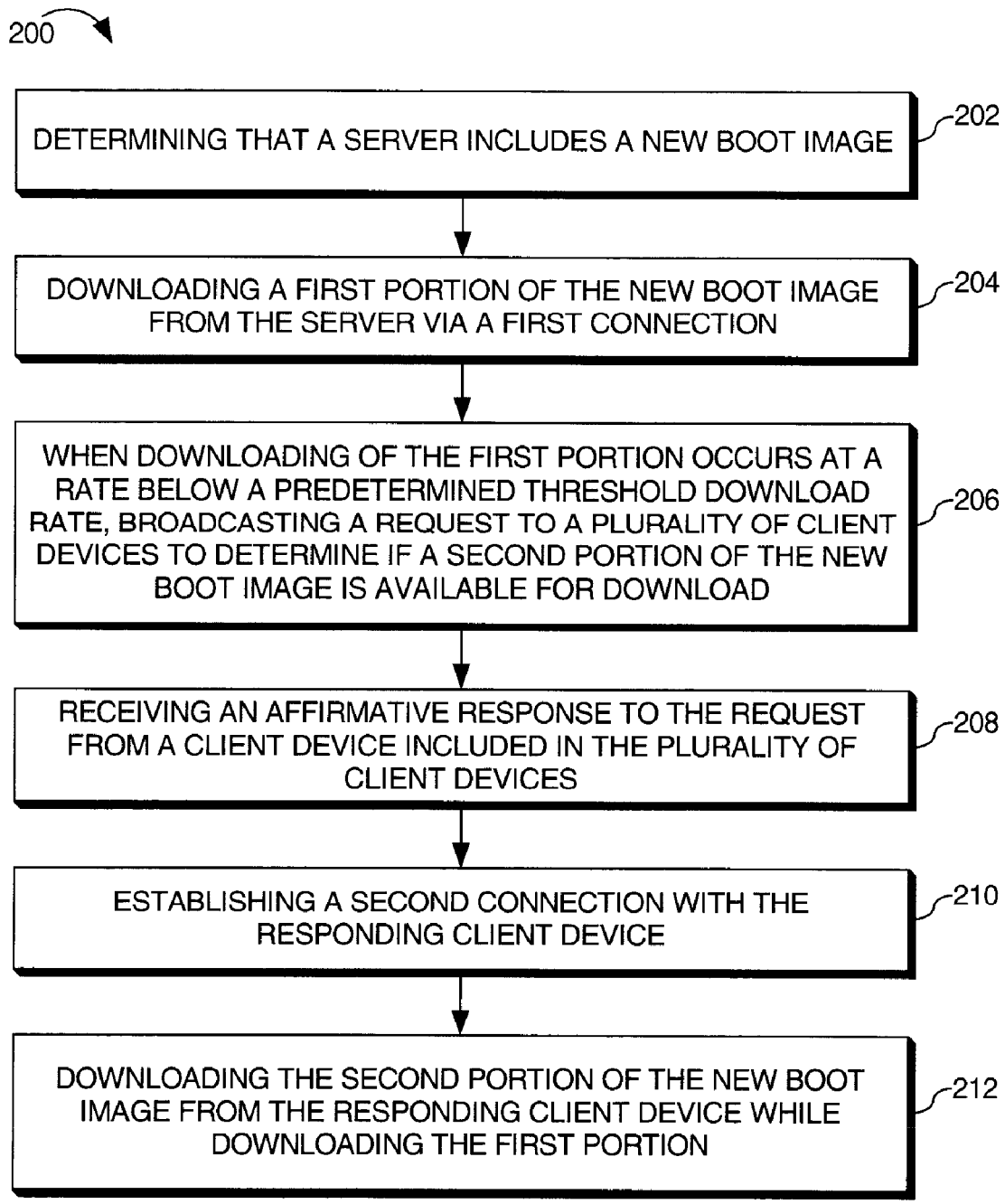
FIG. 2 is a flow chart illustrating a method for managing boot images in a retail store environment in accordance with an exemplary embodiment of the present invention.

FIG. 2 is a flow chart illustrating a method for managing boot images in a retail store environment. In a present embodiment, the method 200 includes determining that a server includes a new boot image 202. The method 200 further includes downloading a first portion of the new boot image from the server via a first connection 204. In an exemplary embodiment, when downloading of the first portion occurs at a rate below a predetermined threshold download rate, the method 200 further includes broadcasting a request to a plurality of client devices to determine if a second portion of the new boot image is available for download 206.

In additional embodiments, the method 200 further includes receiving an affirmative response to the request from a client device included in the plurality of client devices 208. The method 200 may further include establishing a connection with the responding client device 210. The method 200 may further include downloading the second portion of the new boot image from the responding client device while downloading the first portion 212.

It is contemplated that the system and method may also be implemented for managing boot images in various other environments, such as an educational or school environment, where the server 102 may be a school server and the client devices (104, 108, 114) may be computing devices located at the school.

It is contemplated that the invention may take the form of an entirely hardware embodiment, software embodiment or an embodiment containing both hardware and software elements. In a preferred embodiment, the invention is implemented in software, which includes but is not limited to firmware, resident software, microcode, and the like. Furthermore, the invention may take the form of a computer program product accessible from a computer usable or computer-readable medium providing program code for use by or in connection with a computer or any instruction execution system. For the purposes of this description, a computer-usable or computer readable medium may be any apparatus that may contain, store, communicate, propagate, or transport the program for use by or in connection with the instruction execution system, apparatus, or device. It is further contemplated that the medium may be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk read/ write (CD-R/W) and DVD.

A data processing system suitable for storing and/or executing program code will include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, microphone, speakers, displays, pointing devices, and the like) may be coupled to the system either directly or through intervening I/O controllers.

Network adapters may also be coupled to the system to enable the data processing system to connect to other data processing systems or storage devices through intervening private or public networks. Telephone modems, cable or DSL modems and Ethernet cards are just a few of the currently available types of network adapters.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages are to be understood by the foregoing description, and it is apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for managing boot image updates of client devices in a retail store environment comprising:
   determining that a server includes a new boot image;
   downloading a first portion of the new boot image from the server to the first client device via a first connection;
   when downloading of the first portion of the boot image over the first connection occurs at a rate below a predetermined threshold download rate, broadcasting a request from the first client device to a second client device and a third client device to determine if a second portion of the new boot image is available for download;
   receiving, at the first client device, an affirmative response to the request from the second client device;
   establishing a second connection with the second client device;
   downloading the second portion of the new boot image from the second client device while concurrently downloading the first portion;
   monitoring a cumulative download rate of the first client device, the cumulative download rate including download rate of the first portion of the boot image to the first client device over the first connection combined with download rate of the second portion of the boot image to the first client device over the second connection;
   comparing the cumulative download rate to the threshold download rate; and
   when the cumulative download rate is below the threshold download rate, broadcasting a request from the first client device to the third client device to determine if a third portion of the new boot image is available for download.

2. The method of claim 1, wherein the boot image comprises an operating system.

3. The method of claim 1, wherein the first client device comprises a point of sale device in the retail environment.

4. The method of claim 1 further comprising the first client device loading a lightweight kernel during boot up of the first client device, wherein said determining that the server includes the new boot image is performed by the lightweight kernel.

5. A computer program product for managing boot image updates in a retail environment, the computer program product comprising: a non-transitory computer usable storage medium, the non-transitory computer usable storage medium comprising,
   program code to monitor a cumulative download rate of a boot image over a set of one or more connections to the first client device against a download rate threshold, wherein the set of one or more connections comprise a first connection between the server and the first client device;
   program code to broadcast a request for an additional source of the boot image to a plurality of client devices in the retail environment if the download rate of the boot image falls below the download rate threshold; and
   program code to commence download of a portion of the boot image over a second connection between the first client device and a first of the plurality of client devices in response to the first of the plurality of client devices providing an affirmative response to the request while the first client device continues to download other portions of the boot image over the set of one or more connections
   wherein the set of one or more connections comprises a third connection between the first client device and a second of the plurality of client devices, wherein the first connection, second connection, and third connection each carry a portion of the boot image.

6. The computer program product of claim 5, wherein the boot image comprises an operating system.

7. The computer program product of claim 5, wherein the plurality of client devices comprises point of sale devices.

8. A retail environment system comprising:
   a server hosting a boot image; and
   a plurality of client devices communicatively coupled with the server;
   a first client device communicatively coupled with the server and the plurality of client devices, the first client device, begins a first download of a boot image from the server over a first connection between the server and the first client device,
   determines that a transfer rate of the first download falls below a transfer rate threshold and, in response, broadcasts a request for the boot image to the plurality of client devices, and begins a second download of a portion of the boot image from a first of the plurality of client devices that responds affirmatively to the request over a second connection between the first client device and the first of the plurality of client devices while the first client device continues to download the boot image from the server
   the first client device determines that a cumulative transfer rate of the first download and the second download falls below the transfer rate threshold and, in response, broadcasts a second request for the boot image to the plurality of client devices, and begins a third download of a second portion of the boot image from a second of the plurality of client devices over a third connection between the first client device and the second of the plurality of client devices, wherein the second of the plurality of client devices responded affirmatively to the second request.

9. The system of claim 8, wherein the boot image comprises an operating system.

10. The system of claim 8, wherein the plurality of client devices comprises point of sale devices.

11. The system of claim 8, wherein the first portion of the boot image and the second portion of the boot image are different.

12. The system of claim 8, wherein the first client device loads a lightweight kernel during boot up of the first client device, and the lightweight kernel determines that the boot image is available at the server.

* * * * *